(12) United States Patent
Yoon et al.

(10) Patent No.: US 10,149,108 B2
(45) Date of Patent: Dec. 4, 2018

(54) METHOD OF PREDICTING LOCATION OF RENDEZVOUS AND ELECTRONIC DEVICE FOR PROVIDING SAME

(71) Applicant: Samsung Electronics Co., Ltd., Suwon-si, Gyeonggi-do (KR)

(72) Inventors: Seokho Yoon, Seoul (KR); Jooseuk Kim, Seoul (KR); Minhyok Bang, Anyang-si (KR); Dongjoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 14/929,986

(22) Filed: Nov. 2, 2015

(65) Prior Publication Data

US 2016/0127873 A1   May 5, 2016

(30) Foreign Application Priority Data

Nov. 3, 2014   (KR) .......................... 10-2014-0150823

(51) Int. Cl.
*H04W 4/029*   (2018.01)
*G06Q 10/10*   (2012.01)

(52) U.S. Cl.
CPC .......... *H04W 4/029* (2018.02); *G06Q 10/109* (2013.01)

(58) Field of Classification Search
CPC ......... H04W 4/22; H04W 4/02; H04W 4/028; H04W 4/023; H04W 4/025; H04W 4/021; H04W 64/003; H04W 4/029; G06Q 10/109; G06Q 10/1095; G06Q 10/1093; G06Q 10/063114; G06Q 10/04; G06Q 50/01
See application file for complete search history.

(56) References Cited

U.S. PATENT DOCUMENTS

| 7,864,073 | B2 | 1/2011 | Lee et al. |
| 8,489,596 | B1 | 7/2013 | Milton et al. |
| 9,618,343 | B2 * | 4/2017 | Kahn ...................... H04W 4/21 |
| 10,027,770 | B2 * | 7/2018 | Bravo ..................... H04L 67/18 |
| 2011/0081634 | A1 * | 4/2011 | Kurata .................. G01C 21/20 434/236 |
| 2012/0239584 | A1 | 9/2012 | Yariv et al. |
| 2012/0265433 | A1 * | 10/2012 | Viola ................... G01C 21/362 701/410 |

(Continued)

FOREIGN PATENT DOCUMENTS

| KR | 10-2014-0032563 A | 3/2014 |
| WO | 2009/015482 A1 | 2/2009 |

(Continued)

*Primary Examiner* — Magdi Elhag
(74) *Attorney, Agent, or Firm* — Jefferson IP Law, LLP (57) ABSTRACT

A method of predicting a location of a rendezvous and an electronic device for providing the same are provided. The electronic device includes a display unit configured to display a screen executing a schedule management service application and a predicted rendezvous, a storage unit configured to store schedule information input into the application, data related to a place and a region, and a user location history, and a controller configured to recognize the input of the schedule information, score place data based on a schedule place name of the schedule information, and predict a rendezvous based on at least one piece of place data having a high score among the pieces of scored place data.

24 Claims, 5 Drawing Sheets

(56) References Cited

U.S. PATENT DOCUMENTS

| | | | |
|---|---|---|---|
| 2013/0295956 A1* | 11/2013 | Ding | H04W 4/025 |
| | | | 455/456.1 |
| 2013/0297551 A1 | 11/2013 | Smith et al. | |
| 2013/0325332 A1* | 12/2013 | Rhee | G01C 21/00 |
| | | | 701/487 |
| 2014/0141810 A1 | 5/2014 | Shin et al. | |
| 2014/0278057 A1* | 9/2014 | Berns | G01C 21/3484 |
| | | | 701/410 |
| 2014/0278086 A1* | 9/2014 | San Filippo | G01C 21/3423 |
| | | | 701/527 |
| 2015/0045068 A1* | 2/2015 | Soffer | H04W 4/025 |
| | | | 455/456.3 |
| 2015/0142822 A1* | 5/2015 | Xue | G06F 17/3087 |
| | | | 707/743 |
| 2015/0193819 A1* | 7/2015 | Chang | G06Q 30/0252 |
| | | | 705/7.19 |
| 2015/0208202 A1* | 7/2015 | Beaumont | H04W 4/028 |
| | | | 455/456.2 |

FOREIGN PATENT DOCUMENTS

| | | |
|---|---|---|
| WO | 2013/078651 A1 | 6/2013 |
| WO | 2013/192591 A2 | 12/2013 |
| WO | 2014/023011 A1 | 2/2014 |

\* cited by examiner

METHOD OF PREDICTING LOCATION OF RENDEZVOUS AND ELECTRONIC DEVICE FOR PROVIDING SAME

CROSS-REFERENCE TO RELATED APPLICATION(S)

This application claims the benefit under 35 U.S.C. § 119(a) of Korean patent application filed on Nov. 3, 2014 and assigned Serial No. 10-2014-0150823, the entire disclosure of which is hereby incorporated by reference.

TECHNICAL FIELD

The present disclosure relates to a method of predicting a location of a rendezvous through input schedule information and an electronic device for providing the same.

BACKGROUND

An electronic device provides a function of managing a user's schedule beyond a basic function such as a call or message transmission. For example, the electronic device may provide a schedule management application corresponding to an environment in which the user can manage their schedule. The electronic device may store schedule information input by the user, and sound an alarm at a predetermined time or display the schedule information to make the user check the electronic device according to a user's request.

Further, the electronic device may provide a location of a rendezvous by analyzing the input schedule information as well as performing a function of storing or informing of the schedule information input by the user.

The above information is presented as background information only to assist with an understanding of the present disclosure. No determination has been made, and no assertion is made, as to whether any of the above might be applicable as prior art with regard to the present disclosure.

SUMMARY

However, the electronic device provides low accuracy of a location of a rendezvous when it is only based on input schedule information. This is because the electronic device performs a search through an external database (DB) including a place name and an address. Thus, when a store that is part of a franchise having many branches is input as schedule information, the electronic device may have a difficulty in providing an accurate location suitable for a user's intention since many stores having the same name are distributed in several regions. Further, when the external DB does not have an address corresponding to the input schedule information, the electronic device may have difficulty in providing the accurate location to the user.

Aspects of the present disclosure are to address at least the above-mentioned problems and/or disadvantages and to provide at least the advantages described below. Accordingly, an aspect of the present disclosure is to provide a method of predicting a location of a rendezvous, which predicts a rendezvous intended by the user from a user location history as well as the external DB based on the input schedule information and an electronic device for providing the same.

In accordance with an aspect of the present disclosure, an electronic device is provided. The electronic device includes a display unit configured to display a screen executing a schedule management service application and a predicted rendezvous, a storage unit configured to store schedule information input into the application, data related to a place and a region, and a user location history, and a controller configured to recognize the input of the schedule information, store place data based on a schedule place name of the schedule information, and predict a rendezvous based on at least one piece of place data having a high score among the pieces of scored place data.

In accordance with another aspect of the present disclosure, a method of predicting a location of a rendezvous is provided. The method includes recognizing an input of schedule information, scoring place data based on a schedule place name of the schedule information, and predicting the rendezvous based on at least one piece of place data having a high score among the pieces of scored place data.

In accordance with another aspect of the present disclosure, an electronic device is provided. The electronic device includes a display unit configured to display a screen executing a schedule management service application and a predicted rendezvous, a storage unit configured to store schedule information input into the application, data related to a place and a region, and a user location history, and a controller configured to recognize the input of the schedule information, calculate a proportion of a schedule place name of the schedule information among user location history data, and predict a rendezvous based on at least one piece of the user location history data having a high proportion based on a result of the calculation.

In accordance with an aspect of the present disclosure, an electronic device is provided. The electronic device includes a display unit configured to display a screen executing a schedule management service application and a predicted rendezvous, a storage unit configured to store schedule information input into the application, data related to a place and a region, and a user location history, and a controller configured to recognize the input of the schedule information, extract data corresponding to condition information of the schedule information from user location history data, and predict a rendezvous based on data corresponding to text of a schedule place name among the extracted data.

A method of predicting a location of a rendezvous and an electronic device for providing the same according to various embodiments of the present disclosure can analyze input schedule information and more accurately predict a rendezvous intended by the user from a user location history based on the schedule information.

Additionally, the electronic device can provide a recommended place around the predicted rendezvous as well as displaying the predicted rendezvous to the user. Accordingly, the user may receive meaningful information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, step, operation, constituent element, element or a combination thereof, but may not be construed to exclude the existence of or a possibility of addition of one or more other characteristics, numbers, steps, operations, constituent elements, elements or combinations thereof.

In the present disclosure, the expression "or" includes any or all combinations of words enumerated together. For example, the expression "A or B" may include A, may include B, or may include both A and B.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Hereinafter, an electronic device according to various embodiments of the present disclosure will be described with reference to the accompanying drawings. The term "user" as used in various embodiments of the present disclosure may indicate a person who uses an electronic device or a device (e.g., artificial intelligence electronic device) that uses an electronic device.

Figure 1:
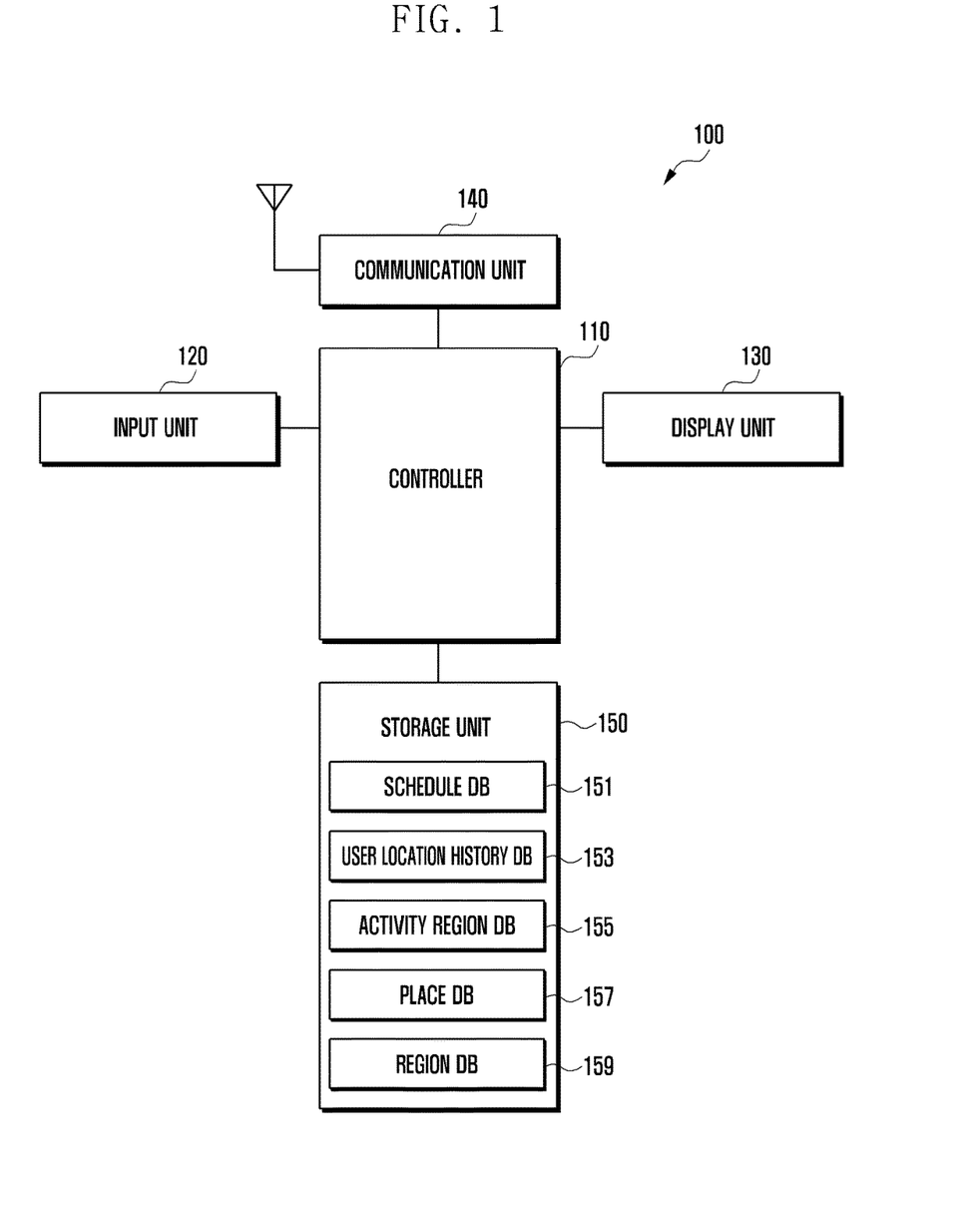
FIG. 1 is a block diagram of an electronic device according to various embodiments of the present disclosure.

FIG. 1 is a block diagram of an electronic device according to various embodiments of the present disclosure.

Referring to FIG. 1, the electronic device 100 may include a controller 110, an input unit 120, a display unit 130, a communication unit 140, and a storage unit 150.

The controller 110 may control an overall operation of the electronic device 100 and a signal flow between internal components of the electronic device 100. The controller 110 may also perform a data processing function for processing data. For example, the controller 110 may include a central processing unit (CPU), an application processor (AP), and the like. The controller 110 may be implemented by a single core processor or a multi-core processor.

When a schedule place name is input into a schedule management service application by the user, the controller 110 may search for a word corresponding to the place name in a place DB and tag the place name as a "place." For example, when the user inputs a schedule place name of "Yongin Everland" through the schedule management service application, the controller 110 may tag "Everland" as the "place."

When the user inputs a schedule place name through the schedule management service application, the controller 110 may search for a word corresponding to a region name in a region DB and tag the place name as a "region." Referring back to the aforementioned example, the word "Yongin" corresponding to the region in "Yongin Everland" may be tagged as the "region."

As described above, when the schedule is input, the place name and the region name may be distinguished. In this specification, the place may refer to a store name, a tourist spot, or the like. The region may refer to a point name or a geographical space uniformly zoned such as Seoul, Gyeonggi-do, New York, Gangnam-gu, or the like.

The controller 110 may extract condition information from the schedule information input by the user. The condition information may include time information and weather information. The weather information may be generated by receiving weather information corresponding to time information input by the user from an external weather DB and storing the received weather information, or may be input by the user.

Further, the condition information may include schedule participant information and schedule characteristics (a company dinner, a meeting, or the like) according to information provided by the schedule management service application. The controller 110 may extract a place suitable for each condition from a user location history DB 153 based on the extracted condition information. The extracted place may be an activity region, and may be stored in an activity region DB 155.

The input unit 120 may transfer a command or data input by the user to the controller 110, the display unit 130, the communication unit 140, and the storage unit 150. The input unit 120 may include a touch panel included in a touch screen of the display unit 130. For example, the controller 110 may detect a signal input through the touch screen.

The display unit 130 may have an integral form in which a display panel and a touch panel are accumulated. The display panel may be implemented in various types such as a liquid crystal display (LCD), an organic light emitting diode (OLED) display, an active-matrix organic light emitting diode (AM-OLED), and a plasma display panel (PDP). Further, the display panel may be implemented to be, for example, flexible, transparent, or wearable. The touch panel may recognize a touch input in at least one type, for example, a capacitive type, a resistive type, an infrared type, and an ultrasonic type.

The communication unit 140 may connect communication between the electronic device 100 and an external electronic device or a server. For example, the communication unit 140 may be connected to a network through wireless communication or wired communication, so as to communicate with the external device or the server. The wireless communication may include, for example, Wi-Fi, bluetooth (BT), and near field communication (NFC). The wired communication may include at least one of, for example, a universal serial bus (USB), a high definition multimedia interface (HDMI), recommended standard 232 (RS-232), and a plain old telephone service (POTS).

The storage unit 150 may include at least one of an internal memory and an external memory.

The internal memory may include, for example, at least one of a volatile memory (for example, a dynamic random access memory (DRAM), a static random access memory (SRAM), a synchronous dynamic RAM (SDRAM), and the like), a non-volatile memory (for example, an one time programmable read-only memory (OTPROM), a programmable ROM (PROM), an erasable and programmable ROM (EPROM), an Electrically Erasable and Programmable ROM (EEPROM), a mask ROM (MROM), a Flash ROM, and the like), a hard disk drive (HDD), and a solid state drive (SSD).

The external memory may include at least one of a compact flash (CF), a secure digital (SD), a micro secure digital (Micro-SD), a mini secure digital (Mini-SD), an extreme digital (xD) and a memory stick.

The storage unit 150 may include a schedule DB 151, the user location history DB 153, an activity region DB 155, a place DB 157, and a region DB 159. The schedule DB 151 may refer to a set of pieces of schedule information input into the schedule management service application. Data stored in the schedule DB 151 corresponds to schedule information and may include a schedule name, a schedule place name, and condition information. The condition information may include time information and weather information. Further, the condition information may include schedule participant information and schedule characteristics (a company dinner, a meeting, or the like) according to information provided by the schedule management service application. The condition information may be input by the user or received from related servers.

The user location history DB 153 may refer to a set of pieces of location information on movement of the user. Data stored in the user location history DB 153 corresponds to user location history data and the user location history DB 153 may include locations from or to which the user has moved in the form of latitude and longitude. The latitude and longitude of locations from or to which the user has moved may be acquired through a GPS function. The locations from or to which the user has moved may be automatically stored in the user location history DB 153 by the user or a user's setting.

As an example, the user location history DB 153 may store Table 1 below.

TABLE 1

R3 $25^{th}$ floor → 37.257, 127.053
R4 $25^{th}$ floor → 37.258, 127.054
R3 $25^{th}$ floor → 37.257, 127.053
Gangnam Bongchujjimdak → 37.507, 127.045
Daehangno KFC → 37.582, 127.002
Busan Haeundae → 35.169, 129.163

Latitude and longitude, that is, location information may be mapped to each place name in the user location history DB 153. Each place name may be a schedule place name of the schedule information input by the user. The stored latitude and longitude mapped to the schedule place name may be a latitude and longitude indicating a location at which the user actually stayed at a time corresponding to condition information of the schedule information input by the user.

Although not illustrated in Table 1, condition information when the schedule place name is input may be also stored in Table 1. The location information according to each place name may be clustered and mapped in the user location history DB 153.

The clustering may refer to a grouping of similar information. For example, although location information 37.2571, 127.0532 and location information 37.2572, 127.0534 correspond to different locations, they are grouped as 37.257, 127.053 and thus considered as the same location. A reason for the clustering is to reduce an error when a rendezvous is predicted.

The activity region DB 155 may refer to a set of regions, in which the user is mainly active in the corresponding condition, included in the user location history DB 153 based on condition information on the schedule information input into the schedule management service application by the user.

For example, when the condition information on the schedule information includes time information from 7 p.m. to 9 p.m., the controller 110 may extract regions, at which the user has stayed for the time, from the user location history DB 153 and store the extracted regions in the activity region DB 155. In another example, when the condition information on the schedule information includes time information from 7 p.m. to 9 p.m. and weather information indicating that it snowed, the controller 110 may extract regions, at which the user has stayed under the condition, from the user location history DB 153 and store the extracted regions in the activity region DB 155.

The place DB 157 may be a set of words corresponding to place names. Data stored in the place DB 157 corresponds to place data and, when a schedule place name is input into the schedule management service application by the user, the controller 110 may search for a word corresponding to the place name in the place DB 157 and tag the found place name as a "place."

For example, when the user inputs a schedule place name of "Yongin Everland" through the schedule management service application, the controller 110 may tag "Everland" as the "place."

The region DB 159 may be a set of words corresponding to regions. Data stored in the region DB 159 corresponds to region data. When a schedule place name is input into the schedule management server application by the user, the controller 110 may search for a word corresponding to the place name in the region DB 159 and tag the place name as a "region" like in the place DB 157.

Referring back to the aforementioned example, the word "Yongin" corresponding to the region in "Yongin Everland" may be tagged as the "region."

According to an embodiment, the place DB 157 and the region DB 159 may be integrated. As an example, the place DB 157 and the region DB 159 may be integrated to be one DB.

Figure 2:
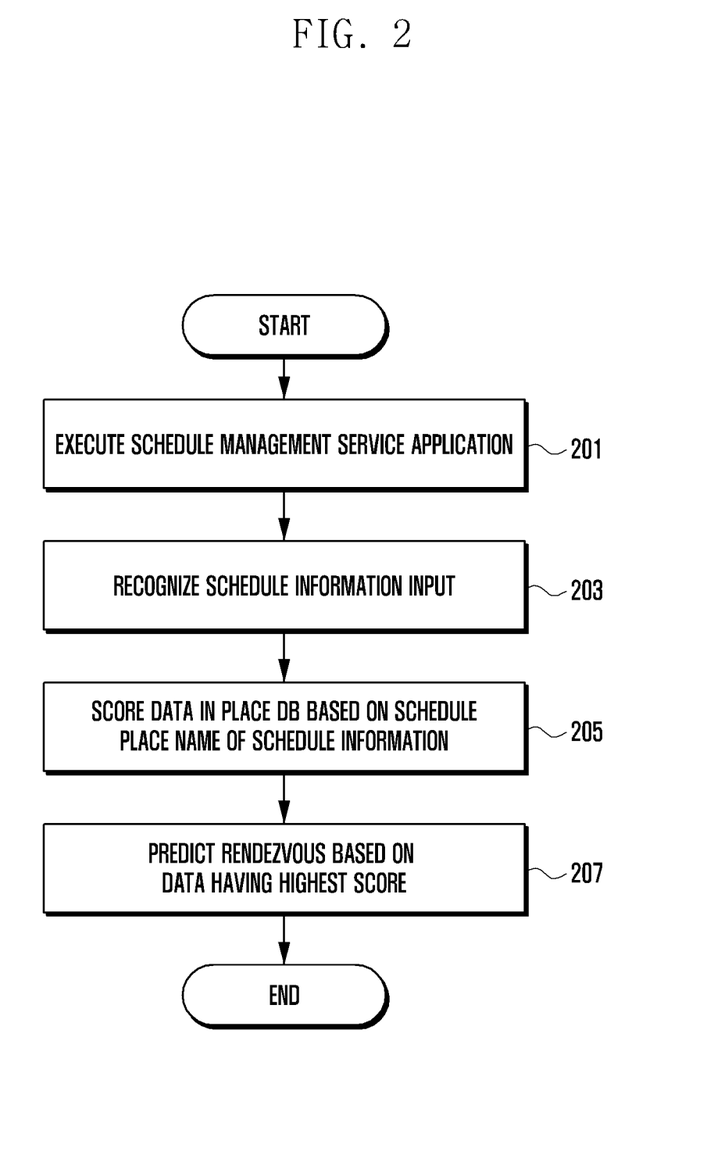
FIG. 2 is a flowchart illustrating a method of predicting a location of a rendezvous according to various embodiments of the present disclosure.

FIG. 2 is a flowchart illustrating a method of predicting a rendezvous according to various embodiments of the present disclosure.

Referring to FIG. 2, the controller 110 may predict a rendezvous based on scoring through at least one of the place DB 157 and the region DB 159. The controller 110 may score data corresponding to the "place" of the input schedule place name in the place DB 157. The data may include a place name, location information, an address, and the like.

In a scoring method, the controller 110 may execute the schedule management service application in operation 201. In operation 203, the controller 110 may recognize a schedule information input. In operation 205, the controller 110 may score data in the place DB 157 based on the schedule place name in the schedule information. That is, the controller 110 may add a score to data having text that matches the "place" of the schedule place name among all pieces of data in the place DB 157. The score corresponds to a place score.

Further, when the controller 110 knows location information on the "place" of the input schedule place name, the controller 110 may set a reciprocal number of the distance between the location information and location information on the data stored in the place DB 157 as the place score. That is, when a distance between two pieces of data is short, the controller 110 gives a high score.

In operation 207, the controller 110 may predict and display a rendezvous based on data having a highest place score. In the displaying of the rendezvous, the controller 110 may display a place name, an address, and the like included in the data.

Further, the controller 110 may score data corresponding to the "region" of the input schedule place name in the region DB 159 as well as the place DB 157. The data may include a place name, location information, an address, and the like. In a scoring method, the controller 110 may add a score to data having text that matches the "region" of the schedule place name among all pieces of data in the region DB 159. The score corresponds to a region score.

Further, when the controller 110 knows location information on the "region" of the input schedule place name, the controller 110 may set a reciprocal number of the distance between the location information and location information on the data stored in the region DB 159 as the region score.

In addition, the controller 110 may add a score to data having text that commonly matches the "place" and the "region" of the schedule place name among all pieces of data in the place DB 157 and the region DB 159. When the controller 110 knows location information on the "region" of the input schedule place name, the controller 110 may set a reciprocal number of the distance between the location information and location information on the data commonly stored in the place DB 157 and the region DB 159 as the region score.

The controller 110 may predict and display a rendezvous based on data having a highest score. In the displaying of the rendezvous, the controller 110 may display a place name, an address, and the like included in the data.

According to another embodiment, the controller 110 may search for data having the highest region score among data in the place DB 157 and the region DB 159 and display a rendezvous through the place name, location information, address, and the like of the data as described above.

Figure 3:
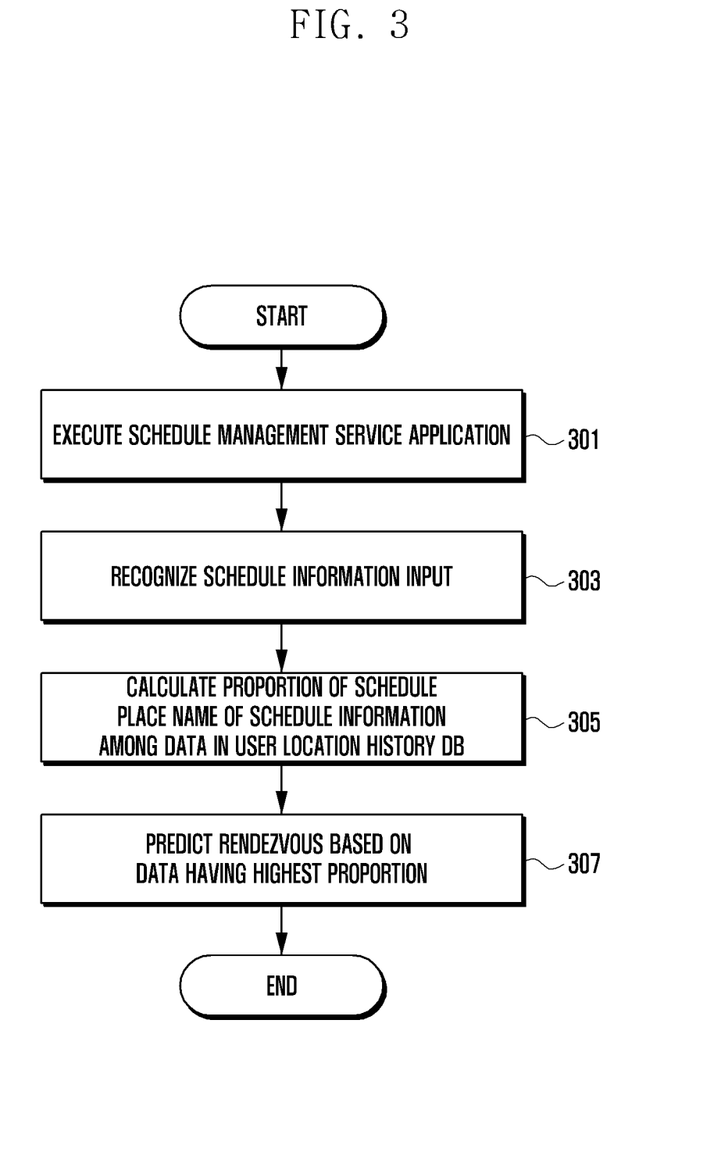
FIG. 3 is a flowchart illustrating a method of predicting a location of a rendezvous according to various embodiments of the present disclosure.

FIG. 3 is a flowchart illustrating a method of predicting a rendezvous according to various embodiments of the present disclosure.

The controller 110 may predict a rendezvous based on classification through the user location history DB 153. Various embodiments of the present disclosure describe naïve Bayesian classification as an example, but may use other classifications.

Referring to FIG. 3, in operation 301, the controller 110 may execute the schedule management service application. In operation 303, the controller 110 may recognize a schedule information input.

In operation 305, the controller 110 may calculate a proportion of location information corresponding to each word in the schedule place name of the schedule information input into the schedule management service application by the user in the user location history DB 153.

In operation 307, the controller 110 may predict a rendezvous based on data having a highest proportion. The user location history DB 153 may store data as shown in Table 1.

For example, the user location history DB 153 may include data such as "R3 $25^{th}$ floor: 37.257, 127.053," "R4 $25^{th}$ floor: 37.258, 127.054," "R3 $25^{th}$ floor: 37.257, 127.053." For example, when the controller 110 of the electronic device 100 recognizes the input schedule place name as "R3 $25^{th}$ floor," the controller 110 of the electronic device 100 may calculate proportions of location information of "R3" and "$25^{th}$ floor" in the user location history DB 153.

For example, it may be assumed that the location information corresponding to the "R3" is "37.257, 127.053" and occupies 100% (1) of the total user location history DB 153. It may be assumed that the location information corresponding to "$25^{th}$ floor" is "37.257, 127.053" and "37.258, 127.054" and occupies 67% (0.67) and 33% (0.33) in the total user location history DB 153. Finally, the controller 110 of the electronic device 100 may calculate a probability in order to select a higher probability with respect to "R3 $25^{th}$ floor."

Since "R3" and "$25^{th}$ floor" indicate the same latitude and longitude "37.257, 127.053," the probability is 0.67 corresponding to the product of two proportions thereof, that is, 67%. Since "37.258, 127.054" which are latitude and longitude of "$25^{th}$ floor" indicating other latitude and longitude have no latitude and longitude that matches "R3," the probability is 0.33 corresponding to the proportion of "37.258, 127.054," that is, 33%.

Accordingly, the latitude and longitude "37.257, 127.053" having a larger proportion may be predicted as latitude and longitude of the schedule information "R3 $25^{th}$ floor" input by the user. The latitude and longitude predicted in the above described way may be latitude and longitude of the rendezvous.

Additionally, the latitude and longitude may be used when the user location history is scored. The user location history is scored in such a manner that, when there is text matching a place indicated by the latitude and longitude, that is, a predicted place name in the data stored in the place DB 157, the matching data of the place DB 157 scores one point. Further, a reciprocal number of the distance between locations of the predicted place and the data stored in the place DB 157 may become the score.

Figure 4:
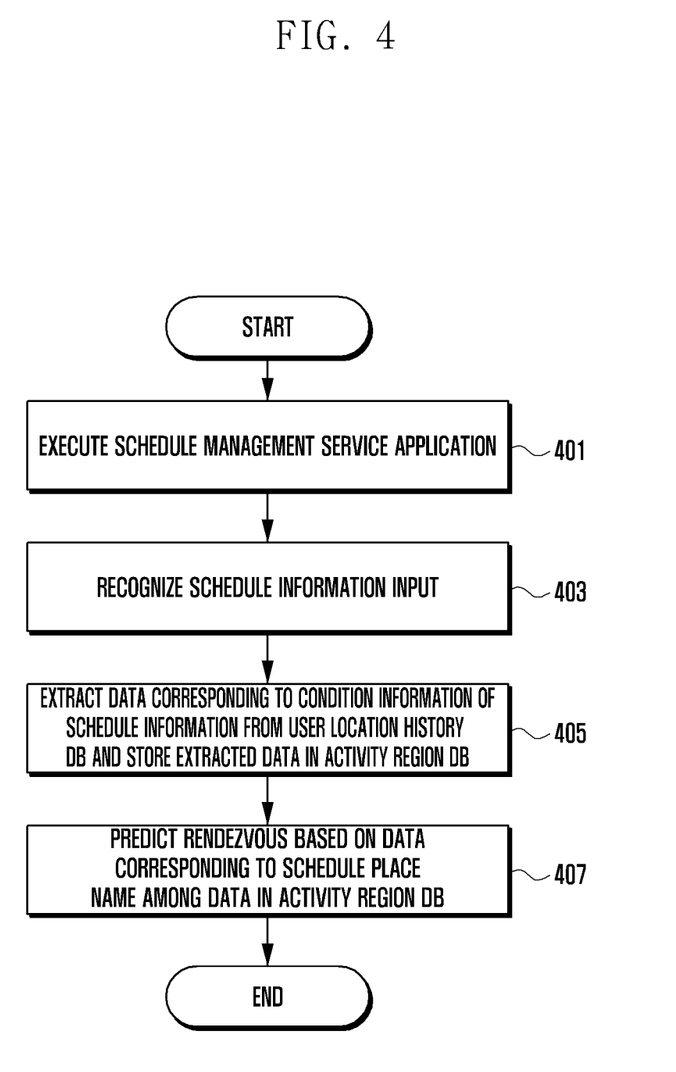
FIG. 4 is a flowchart illustrating a method of predicting a location of a rendezvous according to various embodiments of the present disclosure.

FIG. 4 is a flowchart illustrating a method of predicting a location of a rendezvous according to various embodiments of the present disclosure.

The controller 110 according to various embodiments of the present disclosure may predict the rendezvous by using the activity region DB 155. First, a method of generating the activity region DB 155 will be described.

Referring to FIG. 4, in operation 401, the controller 110 may execute the schedule management service application.

In operation 403, the controller 110 may recognize a schedule information input. In operation 405, the controller 110 may extract data corresponding to condition information of the schedule information from the user location history DB 153. At this time, the extracted data may be stored in the activity region DB as data on the activity region. The condition information may include a time, a day of the week, weather, and the like in the schedule information input by the user. Further, the condition information may include schedule participant information and schedule characteristics (a company dinner, a meeting, or the like) according to information provided by the schedule management service application.

In operation 407, the controller 110 may predict a rendezvous based on data corresponding to the schedule place name from the data of the generated activity region DB 155.

The controller 110 may score the activity region based on the predicted place. The activity region may be scored in such a manner that, when there is text matching a predicted place name in the data stored in the place DB 157, the matching data of the place DB 157 scores one point. Further, a reciprocal number of the distance between locations of the predicted place and the data stored in the place DB 157 may be scored.

According to another embodiment, the controller 110 may predict a rendezvous by using collective intelligence. A plurality of users may upload their own schedule DB 151 and the user location history DB 153 to the network to share the DBs. The controller 110 may predict, as the rendezvous, location information having the largest proportion with respect to the schedule place name in the user location history DB 153 of an external user including the same schedule place name as the input schedule place name.

Further, the controller 110 may predict the rendezvous by using a schedule DB of an external user having a similar schedule information DB uploaded to the network, and the user location history DB and the activity region DB of the external user. The controller 110 may determine similarity between users based on how much activity regions overlap each other and how similar locations are in the user location histories with respect to the same schedule place name.

The methods of FIGS. 2 to 4 described above may predict the rendezvous one by one or predict the rendezvous by scoring the rendezvous and adding the calculated scores.

According to an embodiment, the rendezvous may be predicted by adding all scores, wherein a score may be determined using Equation (1).

$$\text{score} = \alpha \times \text{place score} + \beta \times \text{region score} + \gamma \times \text{activity region score} + \delta \times \text{user location history score} \quad \text{Equation (1)}$$

As shown in Equation (1), the score may be determined as a weighted value (i.e., using weighted values of $\alpha$, $\beta$, $\gamma$, and $\delta$).

The controller 110 may execute the schedule management service application and may recognize a schedule information input by the user in the schedule management service application. Further, the controller 110 may tag input schedule information as a place and a region through the place DB 157 and the region DB 159 of the storage unit. For example, a schedule place name of the schedule information may be "Jongno Starbucks." "Starbucks" may be tagged as the place and "Jongno" may be tagged as the region. Further, in time information of the schedule information, a start time may be "19:00 on 3 Jul. 2014 (Thursday)" and an end time may be "21:00 on 3 Jul. 2014 (Thursday)."

Further, the place DB 157 may be the type in which the separately divided place DB 157 and region DB 159 are combined. Accordingly, in the following embodiment, the place and the region may be stored in the place DB 157 in a combined form without division.

The controller 110 may calculate a place score and a region score. The place may be scored in such a manner that, when text (for example, Starbucks) tagged as the "place" in the input schedule place name matches data stored in the place DB 157, the matching data stored in the place DB 157 scores one point.

Further, when the controller 110 knows location information on text tagged as the "place" in the input schedule place name, the controller 110 may score a reciprocal number of the distance between the location information and location information on the data stored in the place DB 157. That is, when the distance between two pieces of data is short, the controller 110 gives a high score.

The region may be scored in such a manner that, when text (for example, Jongno) tagged as the "region" in the input schedule place name matches data stored in the region DB 159, the matching data stored in the place DB 157 scores one point.

Further, the region may be scored in such a manner that, when the controller 110 knows location information on text tagged as the "region" in the input schedule place name, a reciprocal number of the distance between the location information and location information on the data stored in the region DB 159 or the place DB 157 may become the score. That is, when the distance between two pieces of data is short, the controller 110 gives a high score.

In order to acquire one point from each of the place score and the region score, the text "Starbucks" or "Jongno" should be included in the data of the place DB 157. "Starbucks Jongno" may acquire one point from each of the place score and the region score. "E-mart Jongno" may acquire one point from the region score.

The controller 110 may calculate an activity region score. The activity region may be scored in such a manner that, when an activity region extracted as condition information from the input schedule information matches text of the data stored in the place DB 157, the matching data of the place DB 157 may score one point.

Further, with respect to the activity region score, a reciprocal number of the distance between the location information on the activity region extracted as the condition information from the input schedule information and location information on the data stored in the place DB 157 becomes the score.

The controller 110 of the electronic device 100 may extract the activity region from 19:00 to 21:00 from the user location history DB 153. For example, it may be assumed that extracted activity regions correspond to "Jongno," "Yeongtong," and "Eunpyeong."

The controller 110 may score the data of the place DB 157 based on the three extracted activity regions. Referring to Table 2, the controller 110 gives one point for an item of the activity region score only to the data of the place DB 157 including Jongno," "Yeongtong," and "Eunpyeong" among the data of the place DB 157. Each of "Starbucks Jongno," "E-mart Eunpyeong," and "E-mart Jongno" may acquire one point for the item of the activity region score.

The controller 110 may calculate a user location history score. The user location history may be scored in such a manner that, when location information corresponding to each word of the schedule place name in the input schedule information matches a place predicted based on a proportion occupied in the user location history DB 153 and text of the data stored in the place DB 157, the matching data of the place DB 157 may acquire one point.

When the controller 110 predicts "Jongno," the controller 110 may give one point only for the data of the place DB 157 including "Jongno" in an item of the user location history score. Each of "Starbucks Jongno" and "E-mart Jongno" may acquire one point for the item of the user location history score.

The controller 110 may sum up the scores and detect data of the place DB having the highest score. Referring to Table 2, "Starbucks Jongno" acquires 4 points and "E-mart Jongno" acquires two points. "E-mart Eunpyeong" acquires one point and "Hangaribossam Metan" and "Gimbabcheonguk" acquire 0 points.

The controller 110 may predict a rendezvous based on the data of the place DB having the highest score. Alternatively, the controller 110 may display, as the predicted rendezvous, n pieces of data of the place DB 157 having the highest score as well as the data of the place DB 157 having acquired the highest score.

Referring to Table 2 below, the controller 110 may predict "Starbucks Jongno" having acquired four points corresponding to the highest score as the rendezvous of the schedule information.

TABLE 2

| Place DB data | Place score | Region score | Activity region score | User location history score | Total sum |
|---|---|---|---|---|---|
| Hangaribossam Metan | 0 | 0 | 0 | 0 | 0 |
| Starbucks Jongno | 1 | 1 | 1 | 1 | 4 |
| Gimbabcheonguk Gangnam | 0 | 0 | 0 | 0 | 0 |
| E-mart Eunpyeong | 0 | 0 | 1 | 0 | 1 |
| E-mart Jongno | 0 | 1 | 1 | 1 | 3 |

According to another embodiment, the rendezvous may be predicted based on the place score, the region score, and the activity region score, as shown in Equation (2).

$$\text{score} = \alpha \times \text{place score} + \beta \times \text{region score} + \gamma \times \text{activity region score} \quad \text{Equation (2)}$$

The rendezvous may be predicted by a sum of the scores or predicted by a weighted value as shown in Equation (2) (i.e., using weighted values of $\alpha$, $\beta$ and $\gamma$).

Referring to the above described example, in order to acquire one point from each of the place score and the region score, the text "Starbucks" or "Jongno" should be included in the data of the place DB 157. "Starbucks Jongno" may acquire one point from each of the place score and the region score. "E-mart Jongno" may acquire one point from the region score. The controller 110 may extract the activity region from 19:00 to 21:00 from the user location history DB 153. For example, it may be assumed that extracted activity regions correspond to "Jongno," "Yeongtong," and "Eunpyeong." The controller 110 may score the data of the place DB 157 based on the three extracted activity regions. The controller 110 may give one point only to the data of the place DB 157 including Jongno," "Yeongtong," and "Eunpyeong" among the data of the place DB 157 in an item of the activity region score. Each of "Starbucks Jongno," "E-mart Eunpyeong," and "E-mart Jongno" may acquire one point for the item of the activity region score.

As a result, the controller 110 may predict, as a rendezvous, "Starbucks Jongno" having acquired the highest score as shown in Table 3 below.

TABLE 3

| Place DB data | Place score | Region score | Activity region score | Total sum |
|---|---|---|---|---|
| Hangaribossam Metan | 0 | 0 | 0 | 0 |
| Starbucks Jongno | 1 | 1 | 1 | 3 |
| Gimbabcheonguk Gangnam | 0 | 0 | 0 | 0 |
| E-mart Eunpyeong | 0 | 0 | 1 | 1 |
| E-mart Jongno | 0 | 1 | 1 | 2 |

According to another embodiment, the rendezvous may be predicted based on the place score, the region score, and the user location history score as shown in Equation (3).

$$\text{score} = \alpha \times \text{place score} + \beta \times \text{region score} + \beta \times \text{user location history score} \quad \text{Equation (3)}$$

The rendezvous may be predicted by a sum of the scores or predicted by a weighted value like as shown in Equation (3).

Referring to the above described example, in order to acquire one point from each of the place score and the region score, the text "Starbucks" or "Jongno" should be included in the data of the place DB 157. "Starbucks Jongno" may acquire one point from each of the place score and the region score.

When the controller 110 predicts "Jongno" as a rendezvous based on the user location history DB, the controller 110 may give one point only for the data of the place DB 157 including "Jongno" in an item of the user location history score. Each of "Starbucks Jongno" and "E-mart Jongno" may acquire one point for the item of the user location history score.

As a result, the controller 110 may predict, as a rendezvous, "Starbucks Jongno" having acquired the highest score as shown in Table 4 below.

TABLE 4

| Place DB data | Place score | Region score | User location history score | Total sum |
|---|---|---|---|---|
| Hangaribossam Metan | 0 | 0 | 0 | 0 |
| Starbucks Jongno | 1 | 1 | 1 | 3 |
| Gimbabcheonguk Gangnam | 0 | 0 | 0 | 0 |
| E-mart Eunpyeong | 0 | 0 | 0 | 0 |
| E-mart Jongno | 0 | 1 | 1 | 2 |

According to another embodiment, the rendezvous may be predicted based on the activity region score and the user location history score, as shown in Equation (4).

$$\text{score} = \gamma \times \text{activity region score} + \beta \times \text{user location history score} \quad \text{Equation (4)}$$

The rendezvous may be predicted by a sum of the scores or predicted by a weighted value like as shown in Equation (4).

Referring to the above described example, the controller 110 may extract the activity region from 19:00 to 21:00 from the user location history DB 153. For example, extracted activity regions may correspond to "Jongno," "Yeongtong," and "Eunpyeong."

The controller 110 may score the data of the place DB 157 based on the three extracted activity regions. The controller 110 may give one point only for the data of the place DB 157 including Jongno," "Yeongtong," and "Eunpyeong" among the data of the place DB 157 in an item of the activity region score. Each of "Starbucks Jongno," "E-mart Eunpyeong," and "E-mart Jongno" may acquire one point for the item of the activity region score.

When the controller 110 predicts "Jongno" as a predicted rendezvous in order to set the user location history score, the controller 110 may give one point only for the data of the place DB 157 including "Jongno" in an item of the user location history score. Each of "Starbucks Jongno" and "E-mart Jongno" may acquire one point for the item of the user location history score.

As a result, the controller 110 may predict, as a rendezvous, "Starbucks Jongno" and "E-mart Jongno" having the highest score as shown in Table 5 below.

TABLE 5

| Place DB data | Activity region score | User location history score | Total sum |
|---|---|---|---|
| Hangaribossam Metan | 0 | 0 | 0 |
| Starbucks Jongno | 1 | 1 | 2 |
| Gimbabcheonguk Gangnam | 0 | 0 | 0 |
| E-mart Eunpyeong | 1 | 0 | 1 |
| E-mart Jongno | 1 | 1 | 2 |

Although not shown in Equation (4), the controller 110 may set the score based on a different reference.

According to an embodiment, the controller 110 may differentially set the score according to popularity. When the controller 110 recognizes an input of "Samsung-dong" by the user in the schedule place name, the controller 110 may give a higher score to "Samsung-dong, Gangnam-gu, Seoul" than "Samsung-dong, Dong-gu, Daejeon" according to popularity.

The controller 110 of the electronic device 100 may determine the popularity through an external DB. The external DB may include a search engine of a portal site. The controller 110 may calculate the popularity through the external DB based on the number of web results of the schedule place name of the schedule information and a sum of marks of places in a region corresponding to the schedule place name. The controller 110 may differentially set the scores through the popularity result.

According to another embodiment, the controller 110 may differentially set the scores according to a distance difference based on a current location. For example, the controller 110 may recognize an input by the user of "mountain" as the schedule place name and an input of "14:00 on 27 August" as a start time. The controller 110 may recognize that the time when the schedule information is input, that is, the current time is "13:00 on 27 August" and a current location of the user is "around Seoul University." At this time, the controller 110 may give an additional score to "Mt. Gwanak," which the user can reach in time rather than "Mt. Halla" which the user cannot reach in time.

Figure 5:
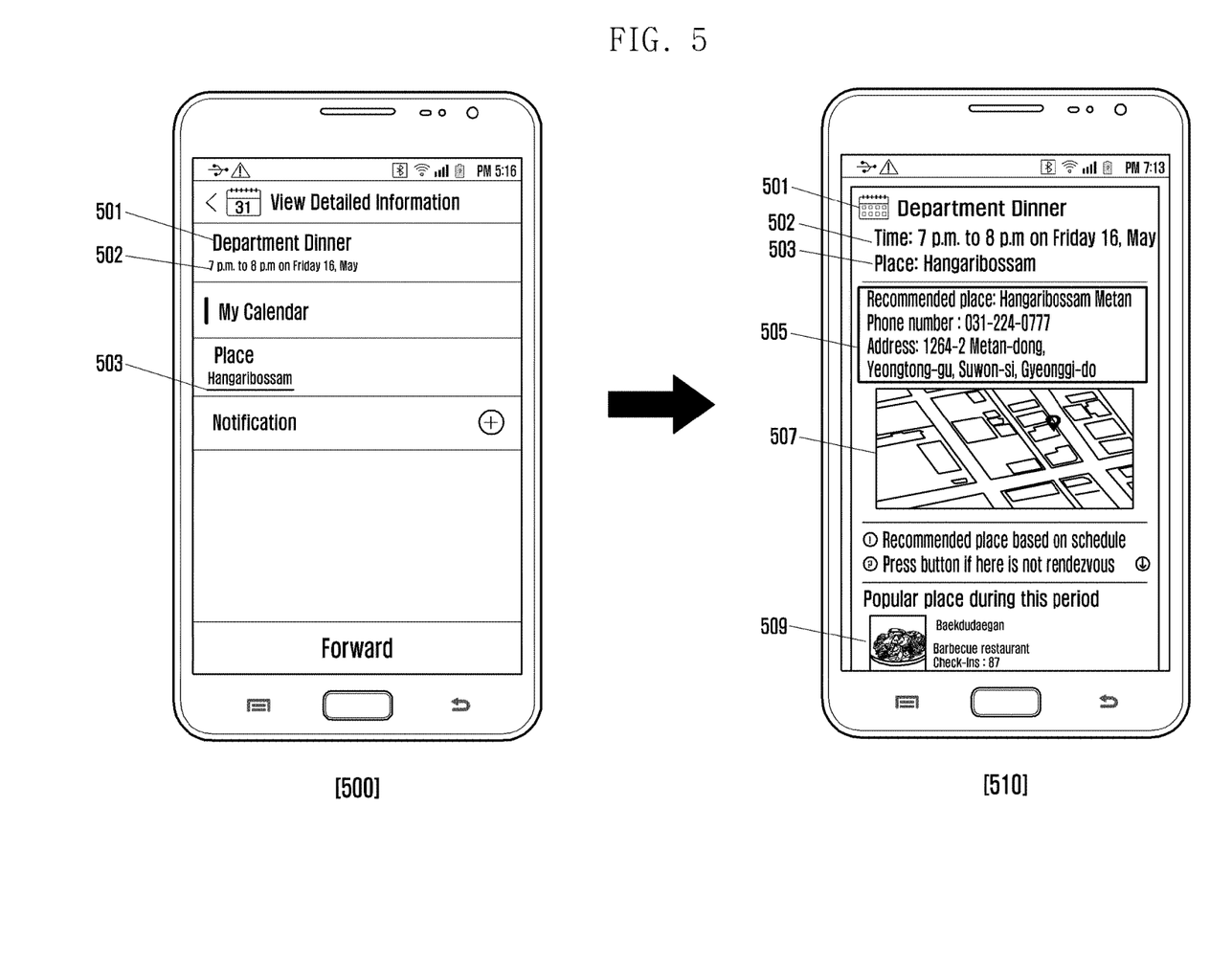
FIG. 5 illustrates an example of a method of predicting a location of a rendezvous according to various embodiments of the present disclosure.

FIG. 5 illustrates an example of a method of predicting a location of a rendezvous according to various embodiments of the present disclosure.

Referring to FIG. 5, a screen 500 may be a screen in which the controller 110 executes a schedule management service application. After executing the screen 500, the controller 110 may recognize a user input in items of a schedule name 501, condition information 502, and a schedule place name 503 corresponding to schedule information. Referring to the screen 500, the schedule name 501 may be a "department dinner," the condition information 502 may be "7:00 p.m. to 8:00 p.m. on 16 May," and the schedule place name 503 may be "Hangaribossam."

When the controller 110 recognizes selection of the schedule place name 503 by the user in the screen 500, the controller 110 may display a screen 510. Further, when the controller 110 recognizes storage of the schedule information by the user in the screen 500, the controller 110 may display the screen 510 after a predetermined time elapses.

The screen 510 may include the schedule name 501, the condition information 502, the schedule place name 503, detailed information on a predicted rendezvous 505, a map of a rendezvous 507, and a recommended place 509. The detailed information on the predicted rendezvous 505 may include a name, a phone number, and an address of the rendezvous. The recommended place 509 may be a famous place that was found around the predicted rendezvous or a place frequently used in the same condition information 502.

Various aspects of the present disclosure can also be embodied as computer readable code on a non-transitory computer readable recording medium. The non-transitory computer readable recoding medium may include magnetic media, such as a hard disk, a floppy disk and a magnetic tape, optical media, such as a compact disc read only memory (CD-ROM) and a digital versatile disc (DVD), magneto-optical media, such as a floptical disk, and a hardware device specially configured to store and execute a program instruction (for example, a programming module), such as a ROM, a random access memory (RAM), a flash memory, and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display configured to display a screen executing a schedule management service application and a predicted rendezvous location;
a memory configured to store schedule information input into the application, data related to a plurality of places and a plurality of regions, the data being stored in a place database, and user location history data, the user location history data being acquired by storing a plurality of individual user locations related to movement of the electronic device; and
at least one processor configured to:
receive the input of the schedule information in the schedule management service application,
assign a set of first scores to each of the plurality of places based on a schedule place name found in the schedule information,
computationally add a set of second scores equivalent to a reciprocal number of a distance between a location of each of the plurality of places and location information from the schedule information to the set of first scores,
predict a rendezvous location based on a high score among the plurality of places assigned a score, and
display the predicted rendezvous location in the schedule management service application on the display.

2. The electronic device of claim 1, wherein the at least one processor is further configured to:
assign scores to each region of the plurality of regions based on the schedule place name found in the schedule information, and
predict the rendezvous location based on a high score among the plurality of regions assigned a score.

3. The electronic device of claim 1, wherein the at least one processor is further configured to:
calculate a proportion of the schedule place name of the schedule information in the user location history data, and
predict the rendezvous location based on at least one piece of the user location history data having a high proportion according to a result of the calculation.

4. The electronic device of claim 3, wherein the at least one processor is further configured to:
calculate proportions for locations, each location defined by a latitude and a longitude, corresponding to each matched portion of text of the schedule place name in the user location history data, and
multiply the calculated proportions of identical locations, according to each matched portion of text.

5. The electronic device of claim 3, wherein the at least one processor is further configured to predict the rendezvous location based on a latitude and a longitude of the user location history data.

6. The electronic device of claim 1, wherein the at least one processor is further configured to:
extract data corresponding to condition information of the schedule information from user location history data, and
predict the rendezvous location based on data corresponding to text identifying the schedule place name extracted from the user location history data.

7. The electronic device of claim 6,
wherein the extracted data corresponds to region data of activities from the user location history data, and
wherein the condition information includes at least one of time information, weather information, schedule participant information, or schedule characteristics.

8. The electronic device of claim 7, wherein the at least one processor is further configured to predict the rendezvous location based on a latitude and a longitude of the region data of activities from the user location history data.

9. A method of predicting a location of a rendezvous location, the method comprising:
receiving an input of schedule information in a schedule management service application;
assigning a set of first scores to each of a plurality of places previously stored in a place database based on a schedule place name found in the schedule information,
computationally adding a set of second scores equivalent to a reciprocal number of a distance between a location of each of the plurality of places and location information from the schedule information to the set of first scores;
predicting the rendezvous location based on a high score among the plurality of places assigned a score; and
displaying the predicted rendezvous location in the schedule management service application on a display.

10. The method of claim 9, wherein the predicting of the rendezvous location comprises:
assigning scores to region data, the region data comprising a plurality of pieces of region data, based on the schedule place name found in the schedule information; and
predicting the rendezvous location based on at least one piece of the plurality of pieces of region data having a high score among the plurality of pieces of region data assigned a score.

11. The method of claim 9, further comprising:
calculating a proportion of the schedule place name of the schedule information in user location history data; and
predicting the rendezvous location based on at least one piece of the user location history data having a high proportion according to a result of the calculation.

12. The method of claim 11, wherein the calculating of the proportion comprises:
calculating proportions for locations, each location defined by a latitude and a longitude, corresponding to each matched portion of text of the schedule place name in the user location history data; and
multiplying the calculated proportions of identical locations, according to each matched portion of text.

13. The method of claim 11, wherein the predicting of the rendezvous location comprises predicting the rendezvous location based on a latitude and a longitude of the user location history data.

14. The method of claim 9, further comprising:
extracting data corresponding to condition information of the schedule information from user location history data; and
predicting the rendezvous location based on data corresponding to text of the schedule place name from the extracted data.

15. The method of claim 14, wherein the predicting of the rendezvous location comprises predicting the rendezvous location based on a latitude and a longitude of the extracted data, and the extracted data corresponds to activity region data.

16. An electronic device comprising:
a display configured to display a screen executing a schedule management service application and a predicted rendezvous location;

a memory configured to store schedule information input into the application, data related to a place, a region, and a user location history; and at least one processor configured to:
- receive the input of the schedule information in the schedule management service application,
- calculate a proportion of a schedule place name of the schedule information in the user location history data,
- predict a rendezvous location based on at least one piece of the user location history data having a high proportion based on a sum of a result of the calculation and a reciprocal number of a distance between a location of each of the plurality of places and location information from the schedule information, and
- display the predicted rendezvous location in the schedule management service application on the display.

17. The electronic device of claim 16, wherein the at least one processor is further configured to:
- calculate proportions for locations, each location defined by a latitude and a longitude, corresponding to each matched portion of text of the schedule place name in the user location history data, and
- multiply the proportions of identical locations, according to each matched portion of text.

18. The electronic device of claim 16, wherein the at least one processor is further configured to predict the rendezvous location based on a latitude and a longitude of the user location history data.

19. The electronic device of claim 16, wherein the at least one processor is further configured to:
- extract data corresponding to condition information of the schedule information from the user location history data, and
- predict the rendezvous location based on data corresponding to text of the schedule place name from the extracted data.

20. The electronic device of claim 19,
wherein the extracted data corresponds to activity region data, and
wherein the condition information includes at least one of time information, weather information, schedule participant information, or schedule characteristics.

21. The electronic device of claim 20, wherein the at least one processor is further configured to predict the rendezvous location based on a latitude and a longitude of the activity region data.

22. An electronic device comprising:
- a display configured to display a screen executing a schedule management service application and a predicted rendezvous location;
- a memory configured to store schedule information input into the application, data related to a place, a region, and a user location history; and
- at least one processor configured to:
  - receive the input of the schedule information in the schedule management service application,
  - extract data corresponding to condition information of the schedule information from user location history data,
  - assign a score to each of a plurality of places previously stored in a place database based on the extracted data,
  - predict a rendezvous location based on a sum of the score corresponding to text identifying a schedule place name extracted from the user location history data and a reciprocal number of a distance between a location of each of a plurality of places from the user location history data and location information from the schedule information, and
  - display the predicted rendezvous location in the schedule management service application on the display.

23. The electronic device of claim 22,
wherein the extracted data corresponds to region data of activities from the user location history data, and
wherein the condition information includes at least one of time information, weather information, schedule participant information, or schedule characteristics.

24. The electronic device of claim 23, wherein the at least one processor is further configured to predict the rendezvous location based on a latitude and a longitude of the region data of activities from the user location history data.

* * * * *